United States Patent
Malur et al.

(10) Patent No.: US 10,732,974 B2
(45) Date of Patent: Aug. 4, 2020

(54) ENGINE AGNOSTIC EVENT MONITORING AND PREDICTING SYSTEMS AND METHODS

(71) Applicant: Walmart Apollo, LLC, Bentonville, AR (US)

(72) Inventors: Ramu Malur, Bangalore (IN); Pradeep Kumar Gupta, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 246 days.

(21) Appl. No.: 15/585,613

(22) Filed: May 3, 2017

(65) Prior Publication Data

US 2017/0322806 A1 Nov. 9, 2017

Related U.S. Application Data

(60) Provisional application No. 62/332,228, filed on May 5, 2016.

(51) Int. Cl.
 *G06F 9/30* (2018.01)
 *G06F 16/2455* (2019.01)
 (Continued)

(52) U.S. Cl.
 CPC ........ *G06F 9/3017* (2013.01); *G06F 11/3024* (2013.01); *G06F 11/34* (2013.01);
 (Continued)

(58) Field of Classification Search
 None
 See application file for complete search history.

(56) References Cited

U.S. PATENT DOCUMENTS 5,365,514 A * 11/1994 Hershey ............... H04L 43/00
 340/3.21
6,675,591 B2 1/2004 Singh
 (Continued)

OTHER PUBLICATIONS

Application and File History for U.S. Appl. No. 15/292,621, filed Oct. 13, 2016, Inventors: Cbakrobartty et al.
(Continued)

*Primary Examiner* — Van H Nguyen
(74) *Attorney, Agent, or Firm* — Patterson Thuente Pedersen, P.A.

(57) ABSTRACT

An event monitoring, identifying and predicting system comprises at least one database comprising an incoming sensor data stream; a plurality of available data processing engines requiring engine-specific event identifying instruction sets; an abstraction engine configured to receive at least one engine-agnostic event identifying instruction set and convert the at least one engine-agnostic event identifying instruction set to an engine-specific event identifying instruction set suitable for a selected one of the plurality of available data processing engines; a user interface comprising a data processing engine selector by which a user can provide an engine-agnostic event identifying instruction set and select a available data processing engines; and a report generator configured to provide an output result of processing at least a portion of the incoming sensor data stream by the selected data processing engine according to the engine-specific event identifying instruction set.

18 Claims, 4 Drawing Sheets

(51) Int. Cl.
*G06F 11/34* (2006.01)
*G06F 11/30* (2006.01)
*G06F 9/54* (2006.01)

(52) U.S. Cl.
CPC .... *G06F 11/3476* (2013.01); *G06F 16/24568* (2019.01); *G06F 9/542* (2013.01); *G06F 11/3006* (2013.01); *G06F 11/3058* (2013.01)

(56) References Cited

U.S. PATENT DOCUMENTS

| | | | |
|---|---|---|---|
| 6,981,385 | B2 | 1/2006 | Arshansky |
| 7,357,000 | B2 | 4/2008 | Schwichtenberg |
| 7,680,752 | B1 | 3/2010 | Clune, III et al. |
| 7,721,259 | B2 | 5/2010 | Heinke et al. |
| 8,648,706 | B2 | 2/2014 | Ranjan |
| 8,694,880 | B2 | 4/2014 | Krasner et al. |
| 8,725,298 | B2 | 5/2014 | Wallaert |
| 8,890,675 | B2 | 11/2014 | Ranjan |
| 9,092,958 | B2 | 7/2015 | Brueggen |
| 9,304,827 | B2 | 4/2016 | Werth et al. |
| 9,679,125 | B2 * | 6/2017 | Bailor ................ G06F 21/316 |
| 10,073,724 | B2 * | 9/2018 | Chakraborty ........... H04L 67/12 |
| 2002/0049608 | A1 | 4/2002 | Hartsell et al. |
| 2005/0083957 | A1 | 4/2005 | Ilnicki et al. |
| 2009/0055825 | A1 | 2/2009 | Smith et al. |
| 2009/0327331 | A1 | 12/2009 | Mathew et al. |
| 2011/0066752 | A1 | 3/2011 | Lippincott et al. |
| 2012/0124550 | A1 | 5/2012 | Nocera et al. |
| 2012/0330703 | A1 | 12/2012 | Hohmann et al. |
| 2014/0019977 | A1 | 1/2014 | Kakade et al. |
| 2015/0019714 | A1 | 1/2015 | Shaashua |
| 2015/0149298 | A1 | 5/2015 | Tapley |
| 2015/0205309 | A1 | 7/2015 | Kriss |
| 2015/0229557 | A1 | 8/2015 | Kim et al. |
| 2015/0310195 | A1 | 10/2015 | Bailor et al. |
| 2016/0314403 | A1 * | 10/2016 | Chakraborty ........... H04L 67/12 |
| 2017/0111210 | A1 | 4/2017 | Chakrobartty et al. |
| 2017/0212959 | A1 | 7/2017 | Li et al. |

OTHER PUBLICATIONS

Simion, et al. "Slingshot: A modular framework for designing data processing systems", Department of Computer Science, University of Toronto, 33 pages.
Agrawal, Sumeet. "Top Three Reasons Why We Love Informatica Big Data, Management", Dec. 22, 2015, retrieved from http://blogs.infonnatica.com/2015/12/22/topthreereasonsloveinformaticabigdatamanagement/#fbid=1zuQesmdDCo, Retrieved on Feb. 4, 2016, 12 pages.
International Search Report and Written Opinion, for PCT Application No. PCT/US2017/030804, dated Jul. 17, 2017, 15 pages.
International Search Report and Written Opinion, for PCT Application No. PCT/US2016/047336, dated Oct. 24, 2016, 11 pages.
Cyole, Tim, Controller Setup for Alarm Monitoring: Best Practices, Emerson Climate Technologies, Apr. 23-25, 2012, 20 pages.
Honeywell, Networked Control Monitoring & Alarm System, 2002, 4 pages.
Pacific Controls, Cold Storage and Refrigeration, Dec. 8, 2015, 3 pages.
International Preliminary Report on Patentability, Application No. PCT/US2017/030804, dated Nov. 15, 2018, 9 pages.
International Preliminary Report on Patentability, Application No. PCT/US2016/056823, dated Apr. 17, 2018, 6 pages.

* cited by examiner

ENGINE AGNOSTIC EVENT MONITORING AND PREDICTING SYSTEMS AND METHODS

RELATED APPLICATION

The present application claims the benefit of U.S. Provisional Application No. 62/332,228 filed May 5, 2016, which is hereby incorporated herein in its entirety by reference.

TECHNICAL FIELD

Embodiments relate generally to event identifying, monitoring and predicting and more particularly to systems and methods for processing sensor and systems data using engine-agnostic instruction sets to detect or predict events.

BACKGROUND

There are many situations in which data from sensor and other systems is collected for event monitoring and prediction. For example, an entity with commercial refrigeration units in multiple facilities monitors data from sensors in those units to detect malfunction (e.g., failure of a refrigeration component) or predict a need for service (e.g., a particular refrigerator model unit should have its fan blower motor replaced when the sensor detects the occurrence of a signature temperature fluctuation to avoid total unit failure and loss of product). The volume of data for this monitoring and predicting can be significant, considering each sensor may detect data each second (or more often), and there may be hundreds or thousands of sensors in each of hundreds or thousands of locations.

A variety of data processing engines (DPEs) capable of processing this volume of data are commercially available, with new DPEs providing enhanced performance or new features becoming available all the time. Conventionally, engine-specific instructions for the desired monitoring and predicting tasks must be written to enable a specific DPE to operate. This is time-consuming, particularly when a new DPE becomes available and existing instructions must be manually rewritten to enable a migration from the current DPE to the new DPE.

SUMMARY

In an embodiment, an event monitoring, identifying and predicting system comprises at least one database comprising an incoming data stream; a plurality of available data processing engines, each of the plurality of available data processing engines requiring an engine-specific event identifying instruction set; an abstraction engine configured to receive at least one engine-agnostic event identifying instruction set and convert the at least one engine-agnostic event identifying instruction set to an engine-specific event identifying instruction set suitable for a selected one of the plurality of available data processing engines; and a user interface comprising a data processing engine selector by which a user can provide the at least one engine-agnostic event identifying instruction set and select the one of the plurality of available data processing engines, and a report generator configured to provide an output result of processing at least a portion of the incoming data stream from the database by the selected one of the plurality of available data processing engines according to the engine-specific event identifying instruction set.

In an embodiment, a method comprises selecting one of a plurality of available data processing engines; accessing at least one engine-agnostic event identifying instruction set; converting the at least one engine-agnostic event identifying instruction set to an engine-specific event identifying instruction set suitable for the selected one of a plurality of available data processing engines; processing an incoming data stream by the selected one of the plurality of available data processing engines according to the engine-specific event identifying instruction set; and generating an output via a user interface, the output including an indication of any events identified as a result of the processing.

BRIEF DESCRIPTION OF THE DRAWINGS

Embodiments may be more completely understood in consideration of the following detailed description of various embodiments in connection with the accompanying drawings, in which.

Figure 1:
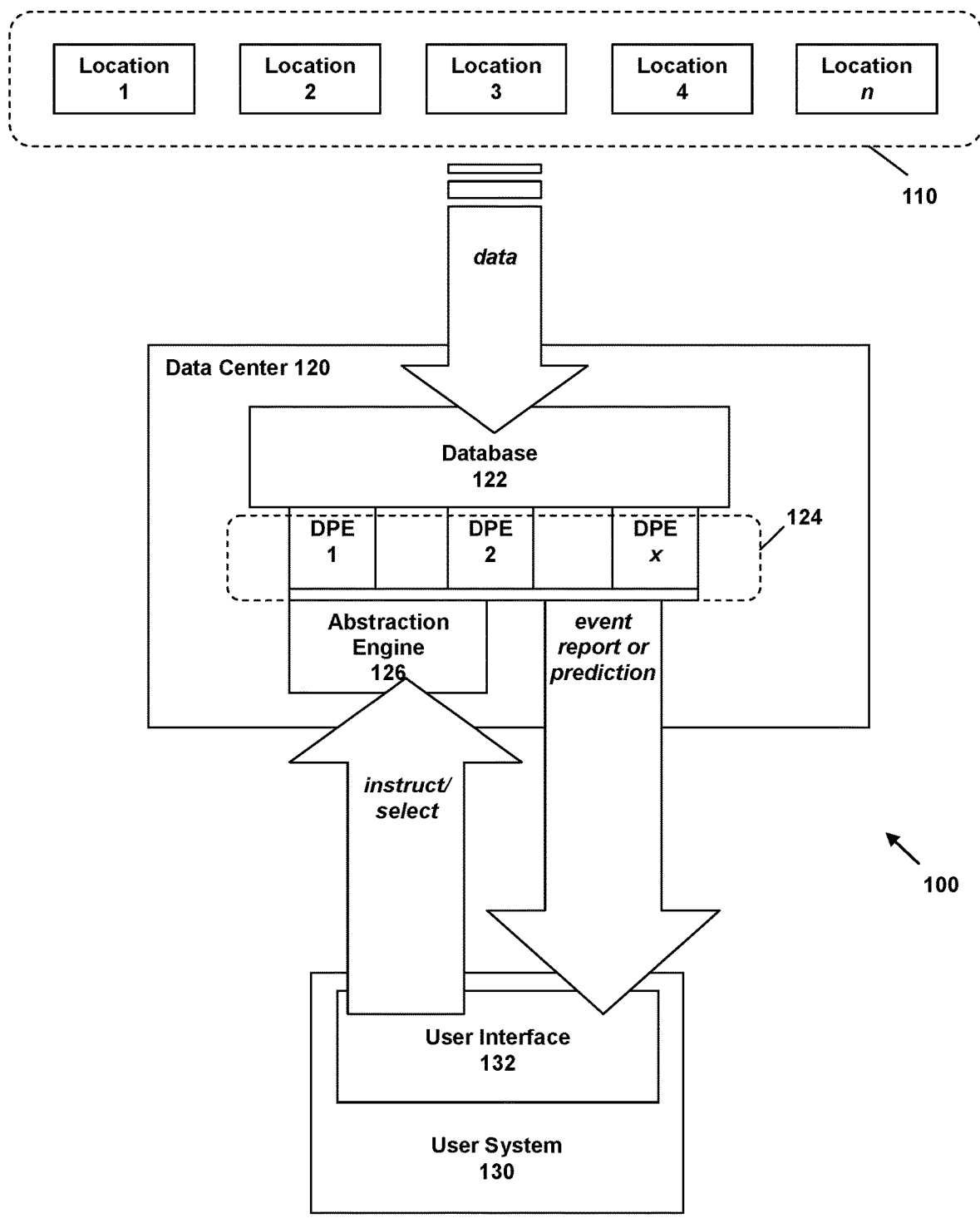
FIG. 1 is a diagram of an engine-agnostic event monitoring and predicting system according to an embodiment.

While embodiments are amenable to various modifications and alternative forms, specifics thereof have been shown by way of example in the drawings and will be described in detail. It should be understood, however, that the intention is not to be limited to the particular embodiments described. On the contrary, the intention is to cover all modifications, equivalents, and alternatives falling within the spirit and scope of the appended claims.

DETAILED DESCRIPTION

Referring to FIG. 1, a block diagram of an embodiment of an engine-agnostic event monitoring and predicting system 100 is depicted. While system 100 can comprise more or fewer components or features in other embodiments, in FIG. 1 system 100 comprises a plurality of locations 110 at which data is generated or from data is obtained; a data center 120 in communication with each location 110 to receive and process the data via one or more data processing engines (DPEs) 124; and a user system 130 at which one or more users can interact with system 100 via a graphical user interface 132.

Locations 110, of which there can be one, several or many in various embodiments, typically are geographically distributed stores, warehouses, commercial centers, buildings, vehicles, structures, or other locations at which there are facilities or systems that are monitored and/or which generate data. In an example introduced above, which will be used herein throughout as one nonlimiting but illustrating situation in which the systems and methods of embodiments can be used, locations 110 are stores, warehouses or other facilities that have refrigeration units with sensors that are monitored to detect or predict events related to operation of the refrigeration units. In particular, Location 1 can be a regional distribution center and Locations 2-n can be retail stores.

In other embodiments, locations 110 can be disparate systems at a single location or can comprise other systems that generate data. For example, instead of sensor data, the data at or from locations 110 can relate to sales, security, research, environmental, behavioral or virtually any kind of data from which it is desired to detect or predict some kind of event.

Data center 120 is communicatively coupled with each location 110 and can be co-located with one or more of locations 110 or with user system 130. In another embodiment, location 110 is geographically remote from locations 110 and/or user system 130. In some embodiments, data center 120 itself can be distributed, with the various components being communications coupled if not physically co-located. Data center 120 also can be integrated with other systems, such as in a retail environment in which data center 120 can be multifunctional or include other systems and functions. For example, in the aforementioned example, data center 120 can receive an incoming data stream comprising sensor data, store the sensor data in a database 122, and process the data stream and/or sensor data, while it also receives, stores and/or processes other data from the stores, warehouses or other facilities of locations 110, such as sales data and security data.

Data center 120 comprises a plurality of DPEs 124, each of which can process the data, such as sensor data in the aforementioned example. Each DPE 1-$x$ comprises suitable hardware, software, firmware or other components for communicating with database 122 to receive data and process some or all of the data from locations 110 or from an intermediary consolidator or other source. In embodiments, each DPE 124 can comprise one or a plurality of clustered engines, and the particular configuration of one or more of DPEs 124 can change according to a particular task to be carried out by that particular DPE 124. Example DPEs that are currently commercially available include SPARK, STORM and SAMZA, among other similar engines, but other DPEs, including those not yet commercially available or developed, can be included in DPEs 124 in various embodiments. In embodiments, one or more of DPEs 124 can comprise a real-time processing engine or component, which can be suitable for the sensor data example used herein in which it is desired to identify an event (e.g., equipment failure) in real time, or a batch processing engine or component, which can be suitable for less time-sensitive event identification in which data is processed in batches (e.g., hourly, daily, weekly, etc.).

The task(s) carried out by any particular DPE 124 can be user-defined by a set of instructions received by data center 120 from user system 130, which comprises a user interface 132. User system 130 can comprise a computer, terminal, tablet or other computing device communicatively connected with data center 120, such as via a network (e.g., a local network or intranet, the internet, etc.). User interface 132 of user system 130 comprises a graphical user interface, such as a screen or monitor that presents a dashboard (discussed in more detail below), and I/O devices, such as a keyboard, mouse, microphone and voice recognition system, etc. User interface 132 also can comprise speakers or other output devices that enable both visual and audible output alerts to be provided, for example, so that an indication of an event occurrence can be reported to a user, including urgently. In some embodiments, user system 130 can comprise a plurality of devices that cooperate to input and output information from and to a user as the user interacts in and with system 100. For example, an output alert in the example related to monitoring refrigeration units could be urgent, either because failure has occurred or is predicted to occur imminently or because quick action is necessary. In such a situation, user system 130 can include or communicate with mobile or other device(s) in order to provide the alert to one or more users who need to receive it most quickly. Additionally or alternatively, user system 130 can include a feature via which a user at a terminal of user system 130 can selectively formulate or forward alerts to appropriate personnel, within or outside of user system 130. Various features of user system 130 and a "dashboard" thereof will be discussed in more detail below.

As previously mentioned, the task(s) carried out by any particular DPE 124 can be user-defined by a set of instructions, and these instructions can comprise code or some other input instruction set format accepted by a particular DPE to define its operation with respect to data processing, analytics logic and/or other functions (any of which can vary from DPE to DPE). Because each DPE 1-$x$ typically is provided by or associated with a different developer or provider, each requires input instructions to be provided in its own unique or particular form and semantics. Thus, a user must select a particular DPE and then write engine-specific code for a selected DPE according to conventional practice. This can be time-consuming, oftentimes requiring personnel to be trained (or new personnel hired) as new engines with new requirements become available. Alternatively, it can cause companies to continue to use legacy engines that do not perform optimally because of the cost of migration to a new or different engine.

In embodiments of system 100, however, data center 120 comprises an abstraction engine 126 in communication with each DPE 1-$x$. Abstraction engine 126 can receive an engine-agnostic instruction set from user system 130 (or another source in other embodiments) and generate engine-specific code for a selected one of the DPEs. This enables a user to define and create a single instruction set, in a user-friendly engine-agnostic format, regardless of which DPE is selected or whether the instruction set may be migrated to a new or different DPE in the future. In fact, abstraction engine 126 can enable the latter, including as new DPEs become available in the future.

In embodiments, the instruction set can be expressed in a variety of engine-agnostic ways, via user system 130. In one embodiment, this can be done via a user interface web application in a domain-specific language (DSL). In another embodiment, the engine-agnostic instructions set can be provided using one or both of configuration files or a REpresentational State Transfer Application Programming Interface (REST API) language, also provided via user interface 132. In still another embodiment, the engine-agnostic instruction set can be provided in some other way, such as text, plain language, etc. Regardless of the input instruction set format specified, it generally is not specific to any DPE and can be generally referred to as instruction set metadata. This metadata can be converted by abstraction engine 126 from the engine-agnostic input form into an engine-specific form that can be used by a selected one of DPEs 124 of data center 120 in embodiments. Furthermore, in embodiments abstraction engine 126 also is configured to convert an already generated engine-specific instruction set (or to return to the original engine-agnostic form and convert it) into a different engine-specific instruction set if a different DPE is selected or a new DPE becomes available at data center 120.

Figure 2:
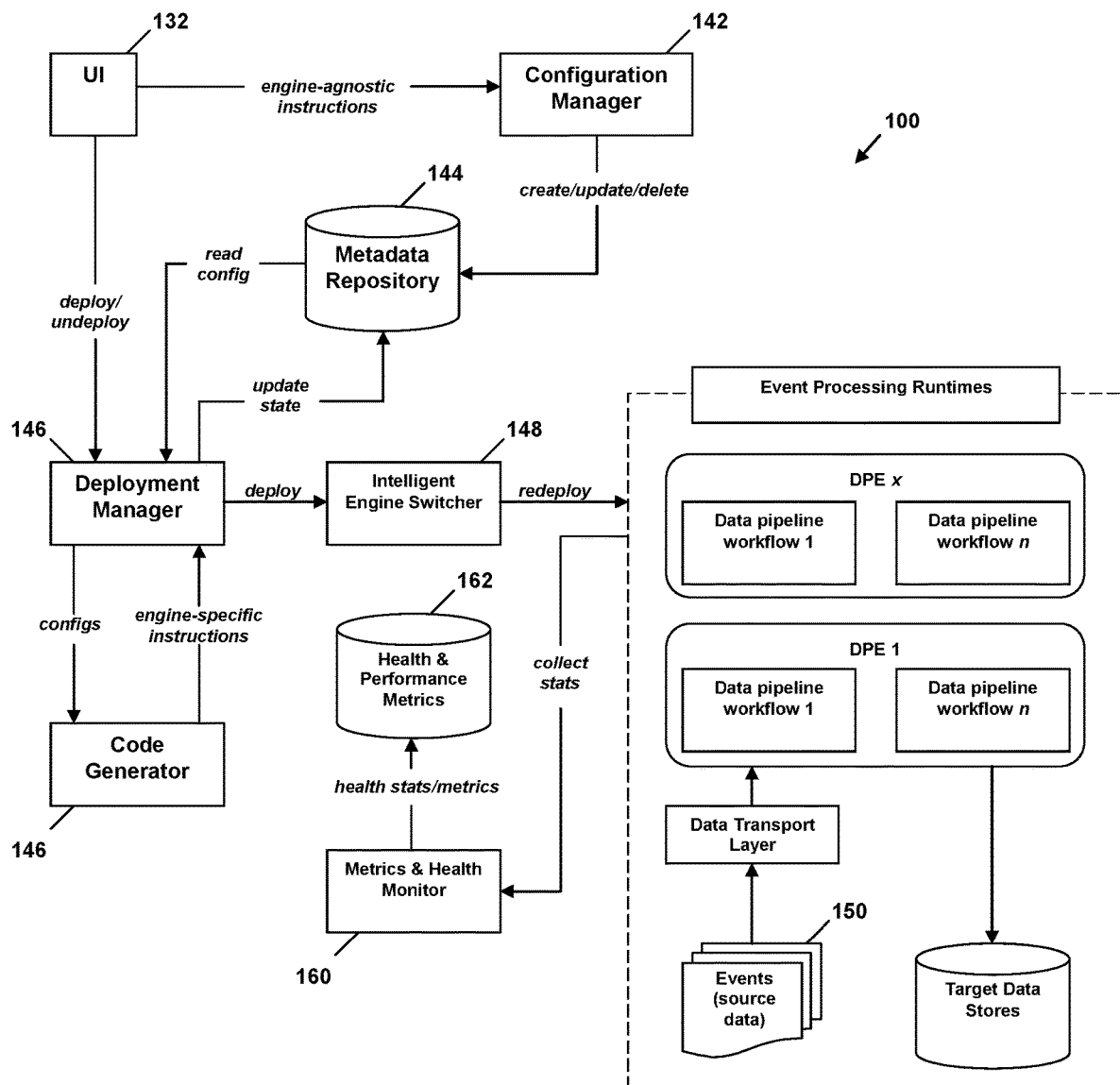
FIG. 2 is a diagram of an engine-agnostic event monitoring and predicting system according to an embodiment.

Referring also to FIG. 2, a configuration manager 142 of data center 120 receives an engine-agnostic instruction set from user interface 132. Configuration manager 142 stores those instructions in a metadata repository 144. Also via user interface 132, a user selects or confirms which of the available DPEs should be used for that engine-agnostic instruction set, and that selection is communicated to a deployment manager 146 of data center 120.

Deployment manager 146 reads configuration information, including the engine-agnostic instruction set, from metadata repository 144 and provides the configuration information to a code generator 146. Code generator 146 uses its knowledge of the semantics required by the selected DPE to convert the engine-agnostic instruction set into an engine-specific instruction set or code suitable for the selected DPE. In embodiments, code generator 146 also can consider other data and information, in addition to the semantics, to formulate the engine-specific instruction set. For example, code generator 146 can obtain and use engine-specific configuration data or instructions published by a DPE developer or other source, or other data and information that is provided by a publisher or made generally available, such as via the internet. Additionally, code generator 146 can obtain and correlate data from health and performance metrics 162 to refine or improve engine-specific instruction sets, as they are created or in operation. Still other sources of data and information can be used by code generator 146 to provide a high-performance engine-specific instruction set.

This engine-specific instruction set is then communicated back to deployment manager 146 to deploy the code via an intelligent engine switcher 148. Intelligent engine switcher 148 can also send instructions to change or switch DPEs from those available, if instructions were received from UI 132 to change DPEs.

In the example embodiment depicted in FIG. 2, DPE 1 is the selected engine, and DPE 1 receives source data 150 for processing according to the engine-specific instruction set. The engine-specific instruction set can include one or more (e.g., x) event identifying instruction sets, and the events to be identified can be events that have already occurred or events that may be predicted. DPE 1 can have a pipeline workflow for each event identifying instruction set, such that some or all of the source data is processed in each pipeline according to its particular instruction set in order to determine whether the target event has or may occur, as the case may be. Each pipeline can be multi-stage or cascaded and can rely on the same, overlapping or different data in order to ultimately determine or predict event occurrence. As such, the event identifying instruction sets (and therefore the engine-specific instruction set of which they form a part) can be complex and time-consuming to run.

As previously mentioned, the event identifying instruction sets also can be run in real-time (or near real-time, to the extent the data is available and can be communicated to or within system 100) or batches. In a some situations or applications, it can be helpful to identify time-based events or trends, such that running in daily, weekly, monthly, yearly, or other incremental batches is desired. In other situations, like the refrigeration sensor example, real-time may be chosen for failure sensing while batch may be selected for predictive maintenance analyses. Still other situations may include real-time processing followed by batch processing of a subset of the real-time data or result. Virtually any type of event identification is possible, defined in an engine-agnostic instruction set that is eventually provided to a selected DPE in an engine-specific form.

In embodiments, system 100 also can aid a user in selecting an appropriate or advantageous DPE according to a characteristic of at least one of the engine-agnostic instruction set, the engine-specific instruction set, the event identifying instruction set, an event, a data type, an available DPE or some other factor. At least partially to that end, system 100 can comprise a metrics and health monitor 160 in embodiments. Metrics and health monitor 160 can collect data, performance indicators, and statistics related to event identification instruction set processing by the DPEs and use that data to determine metrics, stored in a database 162, that can be mined to inform a DPE change related to a current event identification instruction set or a DPE recommendation for a new, incoming engine-agnostic instruction set. In some embodiments, metrics and health monitor 160 can work in conjunction with intelligent engine switcher 148 to provide, via user interface 132, a recommendation of a particular DPE to use or an automatic selection of a most suitable DPE from among the available options. Advantageously, intelligent engine switcher 148 also can recommend to a user a newly available DPE, of which the user may not even be aware, such that the user does not need to invest time in monitoring available DPEs and analyzing their capabilities, which can be complex and time-consuming.

For example, DPE 1 may have different latency and throughput statistics than DPE x, such that DPE 1 is better suited for batch processing of data for event identification instruction sets while DPE x performs better in real-time situations. Via metrics and health monitor 160 and intelligent engine switcher 148, system 100 can provide a user with a recommended DPE along with information regarding why that recommendation is being made within the specific use case presented by the user's engine-agnostic instruction set. Such a recommendation can be for an initial DPE selection for a new event identification instruction set or for migration of an existing event identification instruction set to a different DPE.

In some embodiments, multiple DPEs may be suggested or recommended, or selected without suggestion by a user. For example, an engine-agnostic instruction set can comprise jobs or tasks for cascaded processing in which a first engine may handle a first task, such as real-time processing, and a second engine may handle a second task, such as batch processing of a plurality of real-time processing results from the first engine. Intermediate between the two can be storage of the real-time processing results or other data. Still other arrangements or cooperation of a plurality of engines is possible in other embodiments.

Figure 3:
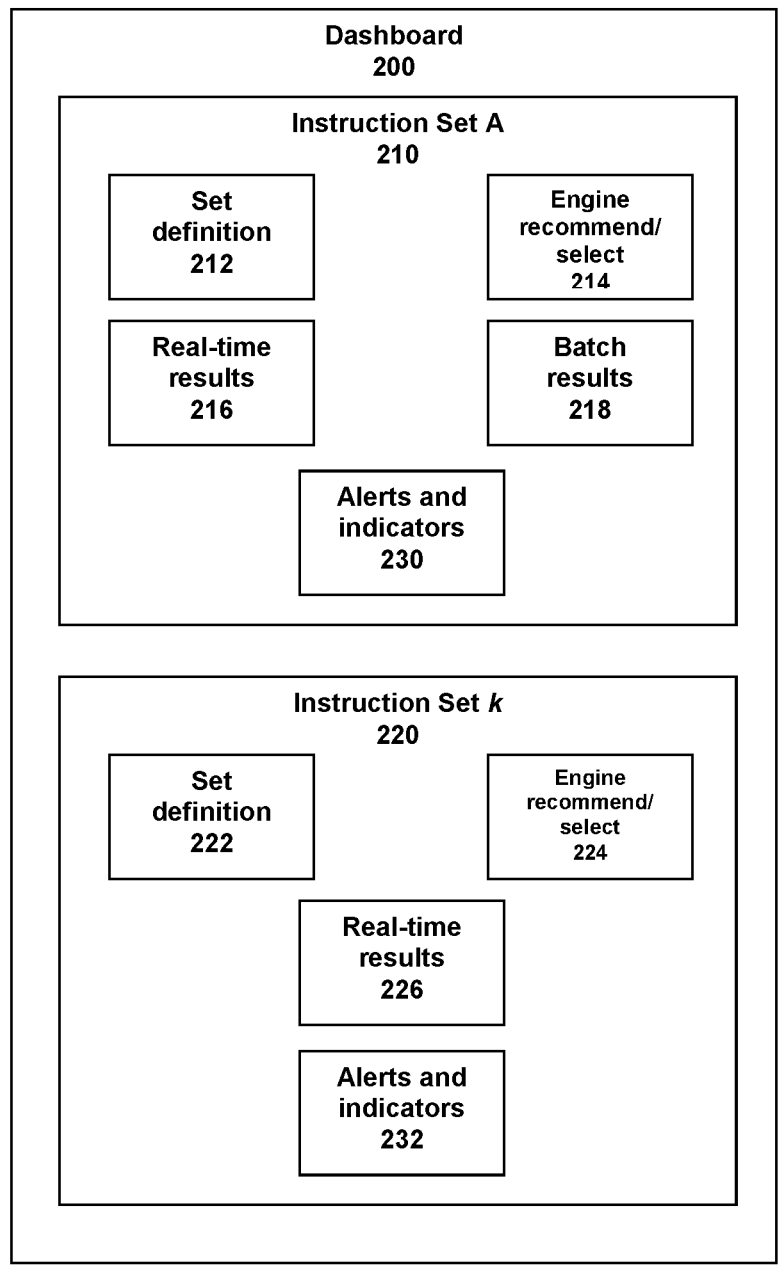
FIG. 3 is a diagram of a dashboard of an engine-agnostic event monitoring and predicting system according to an embodiment.

Referring to FIG. 3, this recommendation, along with results of the event identification processing, can be provided to a user via a dashboard 200 of user interface 132. Dashboard 200 can both present information to and facilitate receipt of information from the user, and it can do so in a convenient, easy to understand way. For example, in an embodiment dashboard 200 can include information related to multiple instruction sets 210 and 220. Though only two instruction sets 210 and 220 are depicted in FIG. 3, in other embodiments the number of instruction sets manageable via dashboard 200 can be higher or lower, and in cases in which more than one instruction set 210 and 220 is available on dashboard 200, the instruction sets can be selectable and/or arrangeable by a user (such as in windows that can be tiled, cascaded or otherwise arranged such that one or more can be viewable or hidden at any time).

A variety of different information related to a particular instruction set 210 and 220 can be presented on dashboard 200, and the information can vary based on the type of instruction set or a user preference. More or less information can be presented in embodiments from that which is depicted in FIG. 3.

For example, both instruction sets 210 and 220 are defined by an engine-agnostic instruction set 212, 222, and dashboard 200 can accept, present or hide information related thereto. In one embodiment, a user can name the instruction sets, and that name can be presented so that the user can easily identify to what the information refers. Dashboard 200 also can present information related to a currently selected or recommended DPE and/or accept from a user a confirmation of a recommended DPE 214, 224.

Dashboard 220 also can present results related to the engine-agnostic instruction set 212, 222, which in embodiments can be real-time results 216, 226; batch results 218; or some other results. Instead of or in additional to results 216, 218, 226, dashboard 200 can provide alerts, trends alarms or other indicators 230, 232 related to any of the instructions, results or other features of system 100. Alerts and indicators 230, 232 can be visual, audible, or in some other form, and as previously mentioned alerts and indicators 230, 232 can be presented via dashboard 200; via dashboard 200 and some other device or methodology; or in some other way. For example, during business hours alerts and indicators 230, 232 can be presented via dashboard 200 at a workstation, while after hours they are provided via a mobile dashboard or other device. The methodology for presenting alerts and indicators 230, 232 also can vary based on the type of information that needs to be conveyed, with more urgent alerts (such as at least some real-time alerts) provided in several ways in embodiments while less urgent alerts (such as some batch results) provided in a single way. In still other embodiments, dashboard 200 can communicate with or comprise additional output devices, such as email and text message systems, printing devices, and others, to provide alerts and indicators 232 or other output forms, such as reports, charts or spreadsheets.

Figure 4:
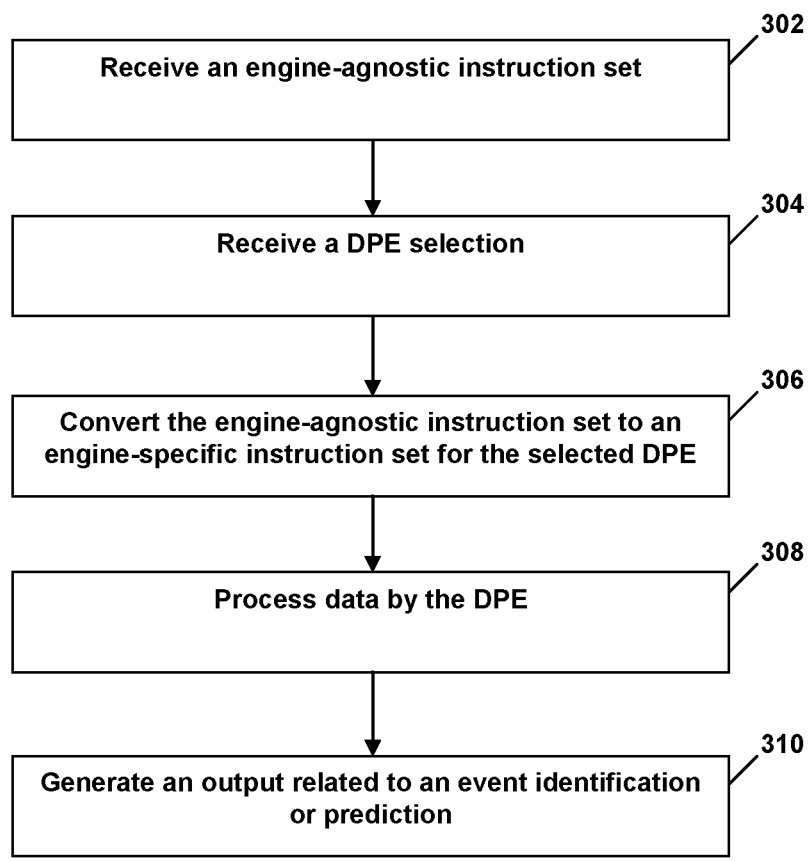
FIG. 4 is a flowchart of an embodiment of a method related to an engine-agnostic event monitoring and predicting system.

Referring to FIG. 4, in embodiments a method relating to system 100 includes receiving an engine-agnostic instruction set at 302, and receiving a DPE selection at 304. Optionally, after receiving the instruction set at 302, system 100 can provide a recommendation for a DPE selection, such that the selection at 304 can become receiving an acceptance or a declination of the recommendation. At 306, system 100 converts the engine-agnostic instruction set to an engine-specific instruction set for the selected DPE. The DPE selection and engine-specific instruction set are then communicated within system 100, such that the corresponding data can be processed by the DPE, according to the engine-specific instruction set, at 308. At 310, system 100 generates an output related to an event identification or prediction based on the processing. At least the tasks of 308 and 310 can be repeated as needed or according to the engine-agnostic instruction set converted to the engine-specific instruction set.

Embodiments discussed herein generally refer to receiving engine-agnostic instructions and transforming or converting those instructions into engine-specific instructions, for the purpose of event identification. Events can include a variety of different activities, occurrences or situations. In other embodiments, the engine-agnostic and engine-specific instructions can have or be used for other purposes, such as more general data processing, workflows, reporting, and machine learning, among others.

In embodiments, system 100 and/or its components can include computing devices, microprocessors and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program.

Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. An event monitoring, identifying and predicting system comprising:
   one or more processors;
   at least one database comprising an incoming sensor data stream;
   a plurality of available data processing engines, each of the plurality of available data processing engines requiring an engine-specific event identifying instruction set to process at least a portion of the incoming sensor data stream to detect events indicative of a need for service;
   an abstraction engine, executed by the one or more processors, to receive at least one engine-agnostic event identifying instruction set, convert the at least one engine-agnostic event identifying instruction set to an engine-specific event identifying instruction set suitable for a selected one of the plurality of available data processing engines, and analyze at least one characteristic of at least one of the database, the incoming sensor data stream, at least one engine-agnostic event identifying instruction set, or the plurality of available data processing engines to obtain at least one metric, and provide a recommendation of one of the plurality of available data processing engines for selection based on the at least one metric;
   a user interface comprising a data processing engine selector by which a user can provide the at least one engine-agnostic event identifying instruction set, review the recommendation of the one of the plurality of available data processing engines, and select the one of the plurality of available data processing engines based on the recommendation, and
   a report generator, executed by the one or more processors, to provide an output result of processing at least a portion of the incoming sensor data stream from the database by the selected one of the plurality of available data processing engines according to the engine-specific event identifying instruction set,
   wherein the engine-agnostic event identifying instruction set comprises at least one engine-agnostic event predicting instruction, and wherein the report generator provides an output alert if an event occurrence is predicted as a result of processing at least a portion of the incoming sensor data stream in the database by the selected one of the plurality of available data processing engines according to the engine-specific event identifying instruction set comprising the at least one engine-agnostic event predicting instruction.

2. The system of claim 1, wherein the selected one of the plurality of available data processing engines, executed by the one or more processors, to process the incoming sensor data stream according to the engine-specific event identifying instruction set to identify an occurrence of at least one event.

3. The system of claim 1, wherein the at least one engine-agnostic event identifying instruction set comprises at least one of domain-specific language (DSL), a configuration file or a REpresentational State Transfer Application Programming Interface (REST API) language.

4. The system of claim 1, wherein the plurality of available data processing engines include at least one of a SPARK engine, a STORM engine, or a SAMZA engine.

5. The system of claim 1, wherein the recommendation of one of the plurality of available data processing engines includes information why the recommendation is being made based on a specific use case presented by the at least one engine-agnostic event identifying instruction set.

6. The system of claim 5, wherein the at least one metric is a performance metric.

7. The system of claim 5, wherein the abstraction engine is executed by the one or more processors, to intelligently switch from one of the plurality of available data processing engines to another of the plurality of available data processing engines, based on the at least one metric, by generating an engine-specific event identifying instruction set suitable for the another of the plurality of available data processing engines.

8. The system of claim 7, wherein the abstraction engine, executed by the one or more processors, to generate the engine-specific event identifying instruction set suitable for the another of the plurality of available data processing engines by converting one of the engine-agnostic event identifying instruction set or a previously converted engine-specific event identifying instruction set.

9. The system of claim 1, wherein the abstraction engine is updated to convert the at least one engine-agnostic event identifying instruction set to an engine-specific event identifying instruction set suitable for a new one of the plurality of available data processing engines as new data processing engines become available.

10. A method comprising:
   receiving a selection of one of a plurality of available data processing engines;
   accessing at least one engine-agnostic event identifying instruction set;
   converting the at least one engine-agnostic event identifying instruction set to an engine-specific event identifying instruction set suitable for the selected one of a plurality of available data processing engines;

processing an incoming sensor data stream by the selected one of the plurality of available data processing engines according to the engine-specific event identifying instruction set;

generating an output via a user interface, the output including an indication of any events identified as a result of the processing analyzing at least one characteristic of at least one of the database, the incoming sensor data stream, at least one engine-agnostic event identifying instruction set, or the plurality of available data processing engines;

obtaining at least one metric as a result of the analyzing;

providing a recommendation, via the user interface, of one of the plurality of available data processing engines based on the at least one metric;

accessing at least one engine-agnostic event predicting instruction set;

converting the at least one engine-agnostic event predicting instruction set to an engine-specific event predicting instruction set suitable for the selected one of the plurality of available data processing engines;

processing an incoming sensor data stream by the selected one of the plurality of available data processing engines according to the engine-specific event predicting instruction set; and generating an output alert via the user interface if an event occurrence is predicted as a result of the processing.

11. The method of claim 10, further comprising creating the at least one engine-agnostic event identifying instruction set via the user interface.

12. The method of claim 11, wherein the creating further comprises defining the at least one engine-agnostic event identifying instruction set by at least one of domain-specific language (DSL), a configuration file, or a REpresentational State Transfer Application Programming Interface (REST API) language.

13. The method of claim 10, wherein selecting one of a plurality of available data processing engines comprises selecting at least one of a SPARK engine, a STORM engine, or a SAMZA engine.

14. The method of claim 10, further comprising:

providing the recommendation, via the user interface, of one of the plurality of available data processing engines with information why the recommendation is being made based on a specific use case presented by the at least one engine-agnostic event identifying instruction set.

15. The method of claim 14, wherein obtaining at least one metric further comprises obtaining at least one performance metric.

16. The method of claim 14, further comprising intelligently switching from one of the plurality of available data processing engines to another of the plurality of available data processing engines, based on the at least one metric, by generating an engine-specific event identifying instruction set suitable for the another of the plurality of available data processing engines.

17. The method of claim 16, further comprising generating the engine-specific event identifying instruction set suitable for the another of the plurality of available data processing engines by converting one of the engine-agnostic event identifying instruction set or a previously converted engine-specific event identifying instruction set.

18. The method of claim 10, further comprising:

updating the available data processing engines to include a new data processing engine; and updating a layer of abstraction to enable converting the at least one engine-agnostic event identifying instruction set to an engine-specific event identifying instruction set suitable for the new data processing engine.

* * * * *